United States Patent
Ghaisas

(10) Patent No.: US 9,810,220 B2
(45) Date of Patent: Nov. 7, 2017

(54) METHOD OF TRANSPORTING ROTATING EQUIPMENT MODULARIZATION

(71) Applicant: Fluor Technologies Corporation, Sugar Land, TX (US)

(72) Inventor: Neetin Ghaisas, Calgary (CA)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 15/192,868

(22) Filed: Jun. 24, 2016

(65) Prior Publication Data

US 2016/0305599 A1 Oct. 20, 2016

Related U.S. Application Data

(63) Continuation of application No. 14/296,323, filed on Jun. 4, 2014, now abandoned.

(60) Provisional application No. 61/831,052, filed on Jun. 4, 2013, provisional application No. 62/007,363, filed on Jun. 3, 2014.

(51) Int. Cl.
| | |
|---|---|
| *F04D 1/00* | (2006.01) |
| *F16M 7/00* | (2006.01) |
| *F16M 11/24* | (2006.01) |
| *F04D 13/06* | (2006.01) |
| *F04D 29/60* | (2006.01) |

(52) U.S. Cl.
CPC ............... *F04D 1/00* (2013.01); *F16M 7/00* (2013.01); *F16M 11/24* (2013.01); *F04D 13/06* (2013.01); *F04D 29/605* (2013.01)

(58) Field of Classification Search
CPC .. F16M 7/00; F16M 11/24; F04D 1/00; F04D 13/06; F04D 29/605
See application file for complete search history.

(56) References Cited

U.S. PATENT DOCUMENTS

| | | | |
|---|---|---|---|
| 1,380,347 A | 6/1921 | Blume | |
| 3,361,410 A * | 1/1968 | Messer | ............... F16M 7/00 248/188.4 |
| 6,068,234 A | 5/2000 | Keus | |
| 7,343,846 B2 | 3/2008 | Stanford et al. | |
| 7,717,395 B2 | 5/2010 | Rowan, Jr. et al. | |
| 7,819,375 B1 | 10/2010 | Johansen | |
| 8,931,217 B2 | 1/2015 | Haney | |
| 2006/0054775 A1 | 3/2006 | Rowan, Jr. et al. | |
| 2010/0132382 A1 | 6/2010 | Rini et al. | |
| 2014/0166845 A1 | 6/2014 | Hooghart et al. | |

OTHER PUBLICATIONS

Vibracon, The Economical Machinery Mounting Solution Marketing Manual, 2005, www.vibracon.com.

* cited by examiner

*Primary Examiner* — Anita M King
(74) *Attorney, Agent, or Firm* — Conley Rose, P.C.

(57) ABSTRACT

A module for an engineering, procurement, and construction (EPC) project is described. The module comprises machinery disposed on a baseplate. The baseplate is coupled with a support structure via adjustable, self-leveling chocks. The chocks maintain a level baseplate surface regardless of whether or not the underside of the baseplate and the support structure are parallel. The chocks reduce and/or eliminate the transfer of the deflection forces from the support structure to the baseplate.

10 Claims, 6 Drawing Sheets

US 9,810,220 B2

METHOD OF TRANSPORTING ROTATING EQUIPMENT MODULARIZATION

This application is a continuation of and claims the benefit to priority under 35 U.S.C. §121 to co-pending U.S. patent application Ser. No. 14/296,323, filed on Jun. 4, 2014 and entitled "Rotating Equipment Modularization" which in turn was related to and claims benefit under 35 U.S. C. §119 to: U.S. Provisional Patent Application Ser. No. 61/831,052, filed on Jun. 4, 2013 and entitled "Rotating Equipment Modularization", and U.S. Provisional Patent Application Ser. No. 62/007,363, filed on Jun. 3, 2014 and entitled "Rotating Equipment Modularization", such that this application also claims priority to the above-referenced provisional applications; additionally, all of the above-referenced priority documents are hereby incorporated by reference for all purposes as if reproduced in their entirety.

FIELD OF THE INVENTION

The field of the invention is engineering, procurement, and construction (EPC) projects, more specifically, systems and methods for modularization of EPC projects.

BACKGROUND

The following description includes information that may be useful in understanding the present invention. It is not an admission that any of the information provided herein is prior art or relevant to the presently claimed invention, or that any publication specifically or implicitly referenced is prior art.

In the construction industry, an Engineering, Procurement, and Construction (EPC) project refers to the task of (i) designing a structure or facility, (ii) procuring the materials necessary to build the facility, and (iii) building the facility, either directly or indirectly using subcontractors. For large EPC projects, such as the construction of a large oil refining complex or an upstream process facility, it is becoming more and more common to modularize the assembly and construction process in order to reduce on-site work. For example, in the case of a refining complex, the facility can be constructed by building "modules" (e.g., sub-structures or smaller structural units) off-site at a "module yard." The modules are then transported to the construction site and assembled with other modules to complete the construction project. Modularizing an EPC project can reduce field labor costs and improve process efficiency by allowing different module yards to specialize in specific construction/assembly techniques.

Modularization of EPC projects is discussed in further detail in co-owned U.S. patent application Ser. No. 12/971365, filed on Dec. 17, 2010. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

For some EPC projects, a "module" can comprise a piece of equipment or machinery (e.g., centrifugal pump, driver motor, etc.) mounted on a baseplate, the baseplate being supported by a support structure (e.g., steel I-beams, frame structure, etc.), as shown in FIG. 1. In conventional modular EPC methods, the baseplate is rigidly coupled with the steel beam, such as by welding or using anchor bolts.

One problem that can arise during a modular EPC project is the deflection and warping of the baseplate (e.g., bending, torsional twisting, etc.) caused during transportation of the module from the module yard to the project site by rail or by land. FIG. 1 illustrates the deflection of a baseplate during transportation. The deflection of the baseplate is caused by several factors including the sag of the support structure (due to the support structure's own weight and the impact loads or shock loads due to uneven road surface, or potholes in the road that are encountered during transportation). If the baseplate deflects past a certain limit, called its elastic limit, the baseplate will likely warp, causing the machinery mounting pedestals to distort. A warped baseplate will then need to be repaired, replaced, and/or machined at the project site, which can be very costly and time consuming.

Another related problem is the possible deflection of, and permanent damage to, expensive equipment and machinery (e.g., deflection of coupled shaft ends). Again, this may require repair at the project site, which will increase costs and delay deadlines.

Thus, there is still a need for devices and processes that improve the modularization of EPC projects by reducing and/or eliminating the risk of baseplate warping.

SUMMARY OF THE INVENTION

The inventive subject matter provides apparatus, systems and methods in which a module for an EPC project comprises a machinery baseplate coupled with a support structure via adjustable, self-leveling chocks. The chocks maintain a level baseplate surface regardless of whether or not the underside of the baseplate and the support structure are parallel. The chocks reduce and/or eliminate the transfer of the deflection forces from the support structure to the baseplate.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 2b is a side view of the module of FIG. 2a.

FIG. 3a shows a close-up view of the chock, baseplate, and support structure of the module of FIG. 2a.

FIG. 3b is a perspective view of the chock of FIG. 2a.

FIG. 3c is a partial cross sectional view of the chock of FIG. 2a.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
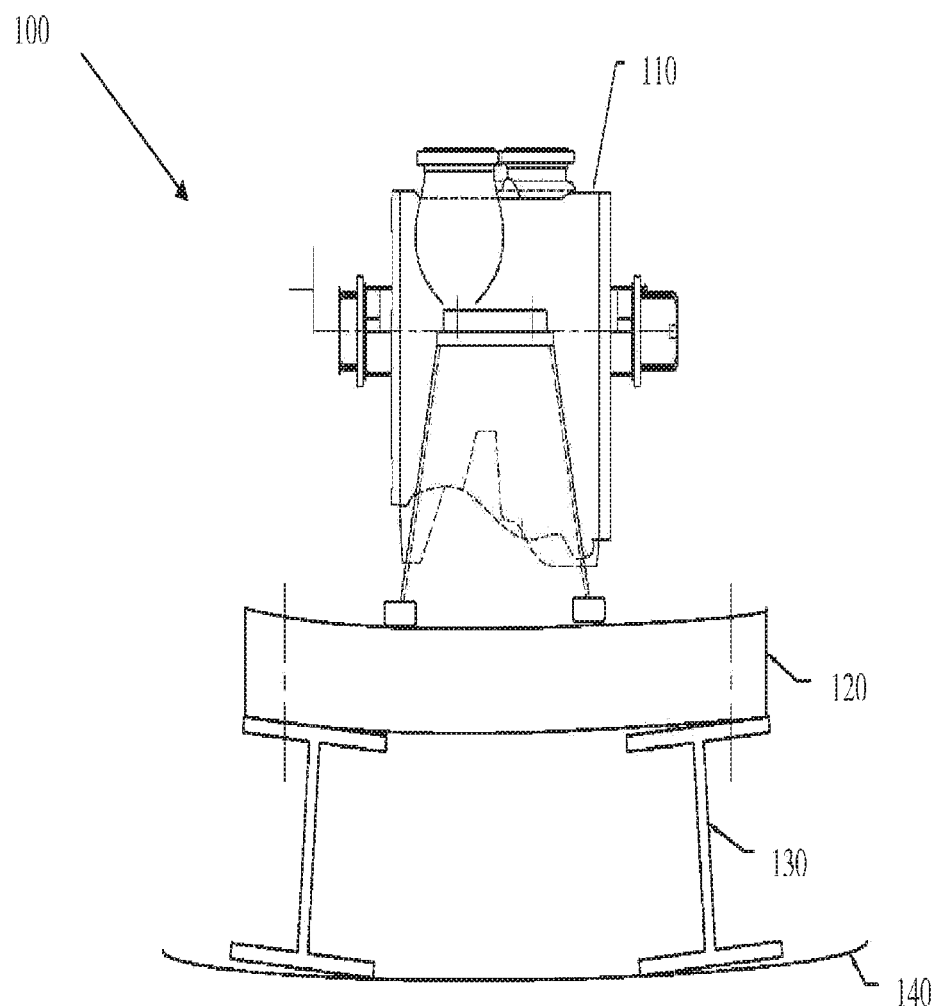
FIG. 1 shows a conventional EPC module with a baseplate directly coupled to a support structure. The baseplate and support structure are deflecting.

FIG. 1 shows a conventional module 100 for an engineering, procurement, and construction (EPC) project. Module 100 comprises two or more support steel structure 130 rigidly coupled with a baseplate 120. Structure 130 can be rigidly coupled with baseplate 120 via welding or a mechanical fastener (e.g., anchor bolts). A piece of machinery or equipment 110 is disposed on top of the baseplate 120. Support structure 130 is disposed on, and may be rigidly coupled with, a module surface 140.

During transportation of module 100 from a module yard to an EPC project site, support steel structure 130 may sag. This sagging can cause baseplate 120 to warp (e.g., the deflection forces in support structure 130 are transferred to baseplate 120). If baseplate 120 warps beyond acceptable limits, baseplate 120 will need to be repaired after it arrives at the EPC project site. Moreover, deflection of baseplate 120 may cause bending in machinery 110, resulting in permanent damage to machinery 110.

Figure 2A:
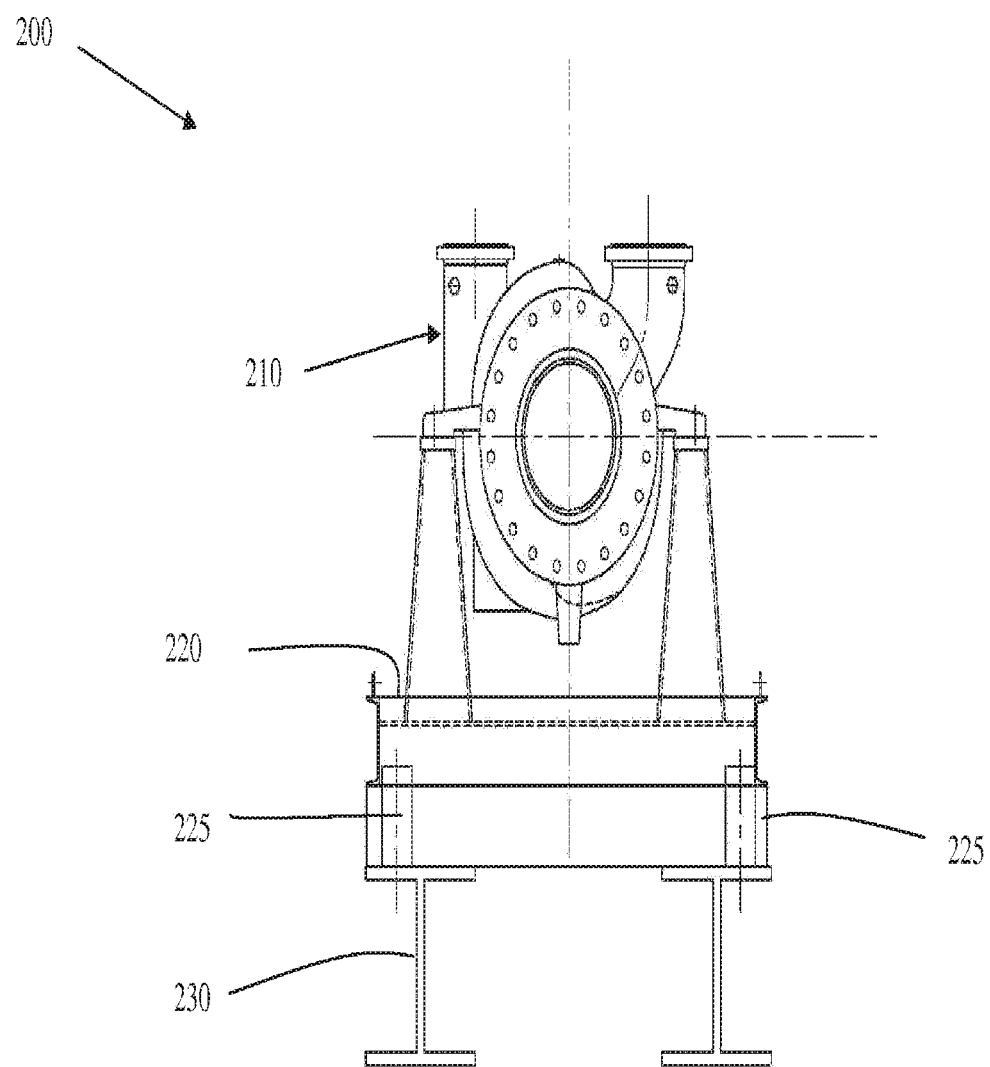
FIG. 2a is a front view of one embodiment of an improved EPC module, which includes a baseplate coupled with a support structure via an adjustable, self-leveling chock.
Figure 2B:
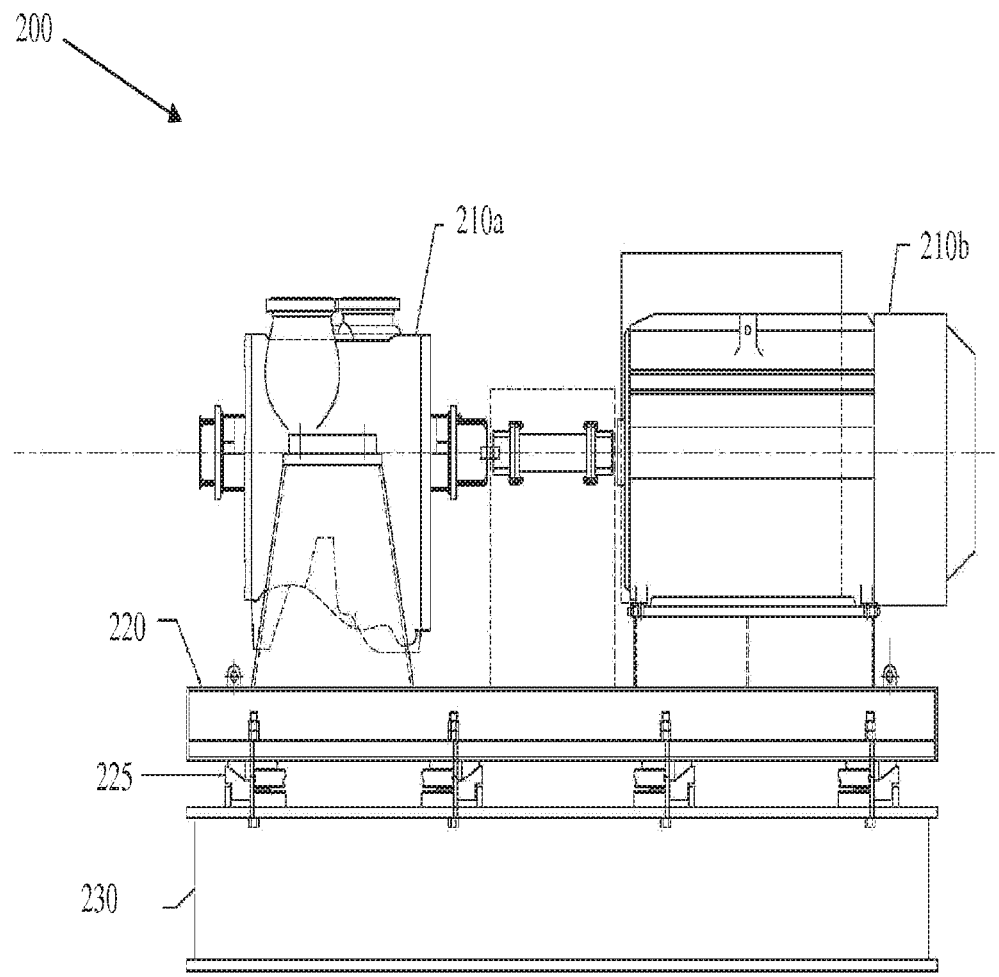

FIGS. 2a and 2b show various views of an improved EPC module 200. Module 200 comprises machinery 210 (pump 210a and driver motor 210b) disposed on top of a baseplate 220. Baseplate 220 is coupled (e.g., secured to, fastened to, etc.) with two or more support structures 230 via a plurality of chocks 225. The chocks help to isolate the deflection of support structure 230 from baseplate 220. More specifically, chocks 225 have self-leveling (e.g., self-adjusting) capabilities that compensate for a slight angular variation between baseplate 220 and the support structure 230. This allows support structure 230 to deflect and bend under static and/or dynamic loads, without warping or twisting baseplate 220.

Figure 3A:
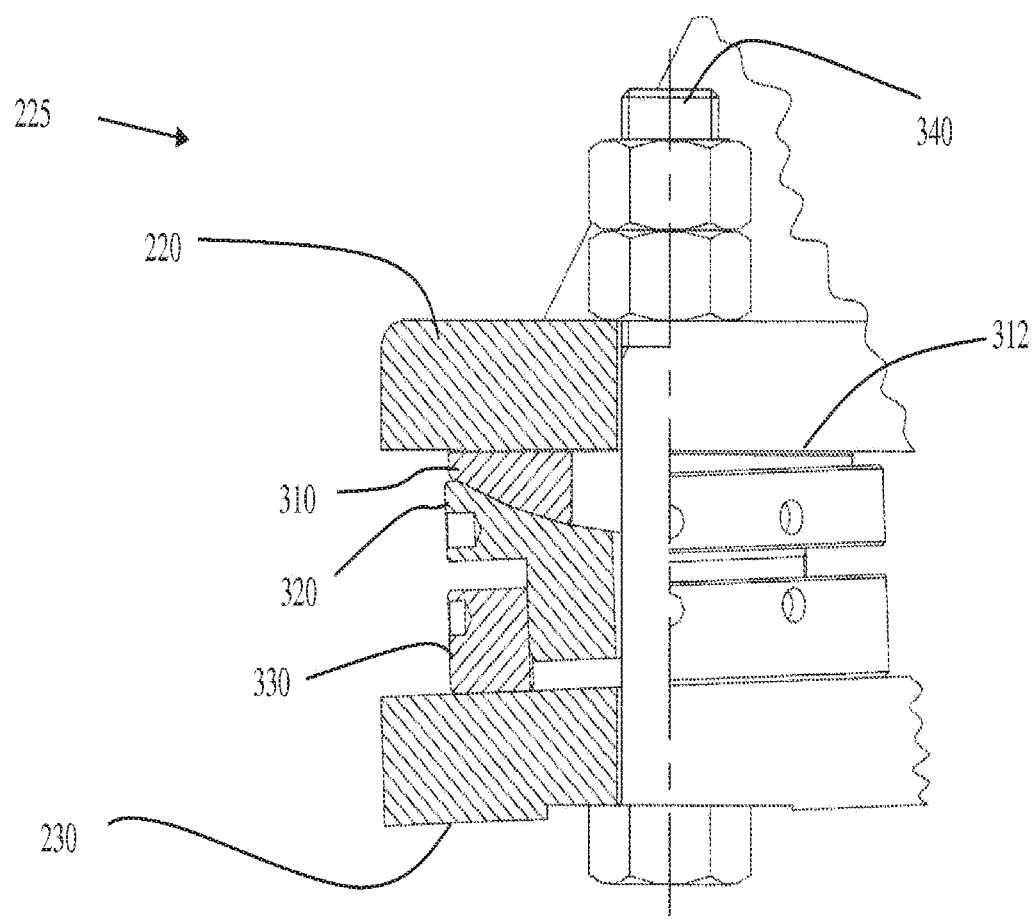
Figure 3B:
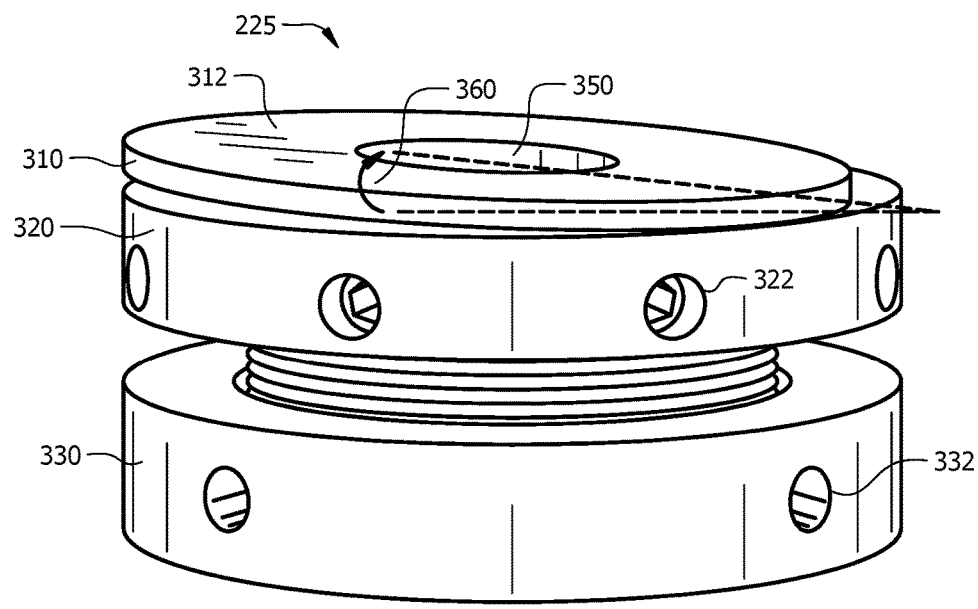
Figure 3C:
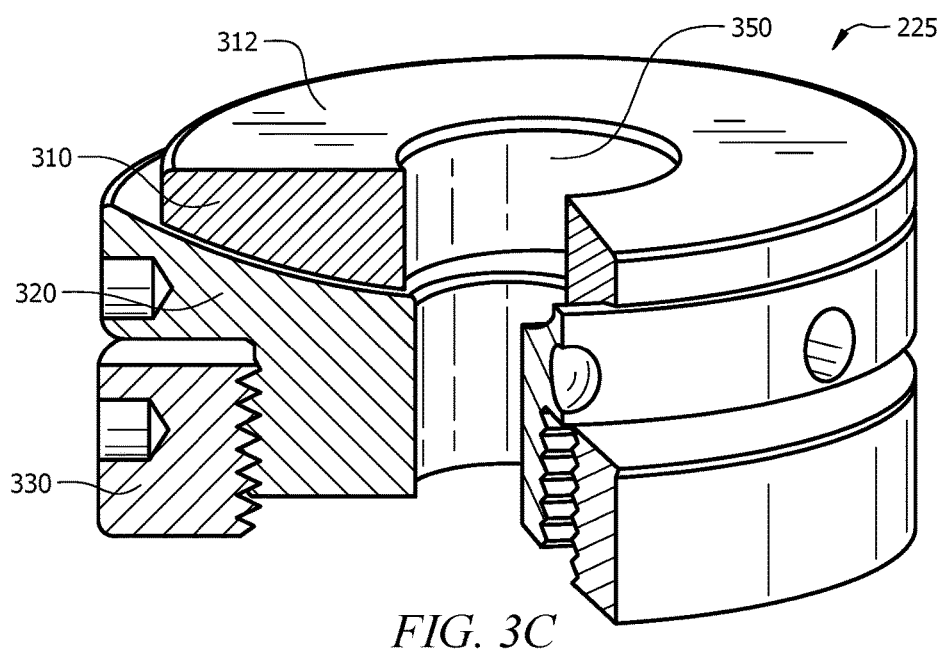

FIG. 3a shows a close-up, partial cross-sectional view of one of the chocks 225 coupled with baseplate 220 and one of the support structure 230. Chock 225 is coupled with baseplate 220 and support structure 230 via an anchor bolt 340. When the through-holes 350 (as shown in FIGS. 3b and 3c) of chock 225, baseplate 220, and structure 230 are aligned, anchor bolt 340 can be inserted through the through-holes 350 and secured by tightening a nut on the end of bolt 340. Before the nut is completely tightened, the vertical height of chock 225, and thus the distance between baseplate 220 and the structure 230, can be adjusted. (The manner of adjusting the height of chock 225 will be described in more detail later on). Once baseplate 220 is leveled by adjusting the height of all chocks 225, bolts 340 can be tightened to the required torque.

FIGS. 3b and 3c show various views of chock 225 apart from baseplate 220, structure 230, and bolt 340. Chock 225 comprises a top annular member 320 threadably coupled with a bottom annular member 330. The threaded coupling allows top member 320 and bottom annular member 330 to rotate relative to one another, which provides for adjustment of the vertical height of chock 225. Top member 320 and bottom member 330 each have a plurality of divets 322 and 332 (e.g., holes), respectively, on their cylindrical sides. Divets 322 and 332 can be engaged by a tool (e.g., wrench) to rotate members 320 and 330 relative to one another to thereby adjust the height of chock 225.

Chock 225 also includes a washer 310 coupled with top annular member 320. The top surface 312 of washer 310 is substantially flat whereas the bottom surface of washer 310 is curved (e.g., spherical, convex, etc.). The top surface of top annular member 320 is concave and has a curvature that complements (e.g., is substantially concentric with) the spherical bottom surface of washer 310. In some embodiments, top surface 312 has a flatness of 0.002 inches or better and/or a surface finish of Ra 250 micro-inches or better. In addition, the portion of the bottom surface of baseplate 220 may also have a flatness of 0.002 inches or better and/or a surface finish of Ra 250 micro-inches or better.

The spherical bottom surface of washer 310 is in sliding contact with the top concave surface of top annular member 320 such that angle 360 (e.g., the angle between the plane defined by the top surface 312 of washer 310 and a hypothetical horizontal plane) is adjustable. In some embodiments, the coefficient of friction between the bottom surface of washer 310 and the top concave surface of top annular member 320 is less than 1, more preferably less than 0.5, and most preferably less than or equal to 0.2. In some embodiments, a lubricant can be used to decrease the coefficient of friction between washer 310 and top annular member 320. Lubricant may also be used to decrease the coefficient of friction between the threads of top annular member 320 and bottom annular member 330. Angle 360 can range from 0-5 degrees, more preferably 0-15 degrees, most preferably 0-35 degrees.

Figure 4:
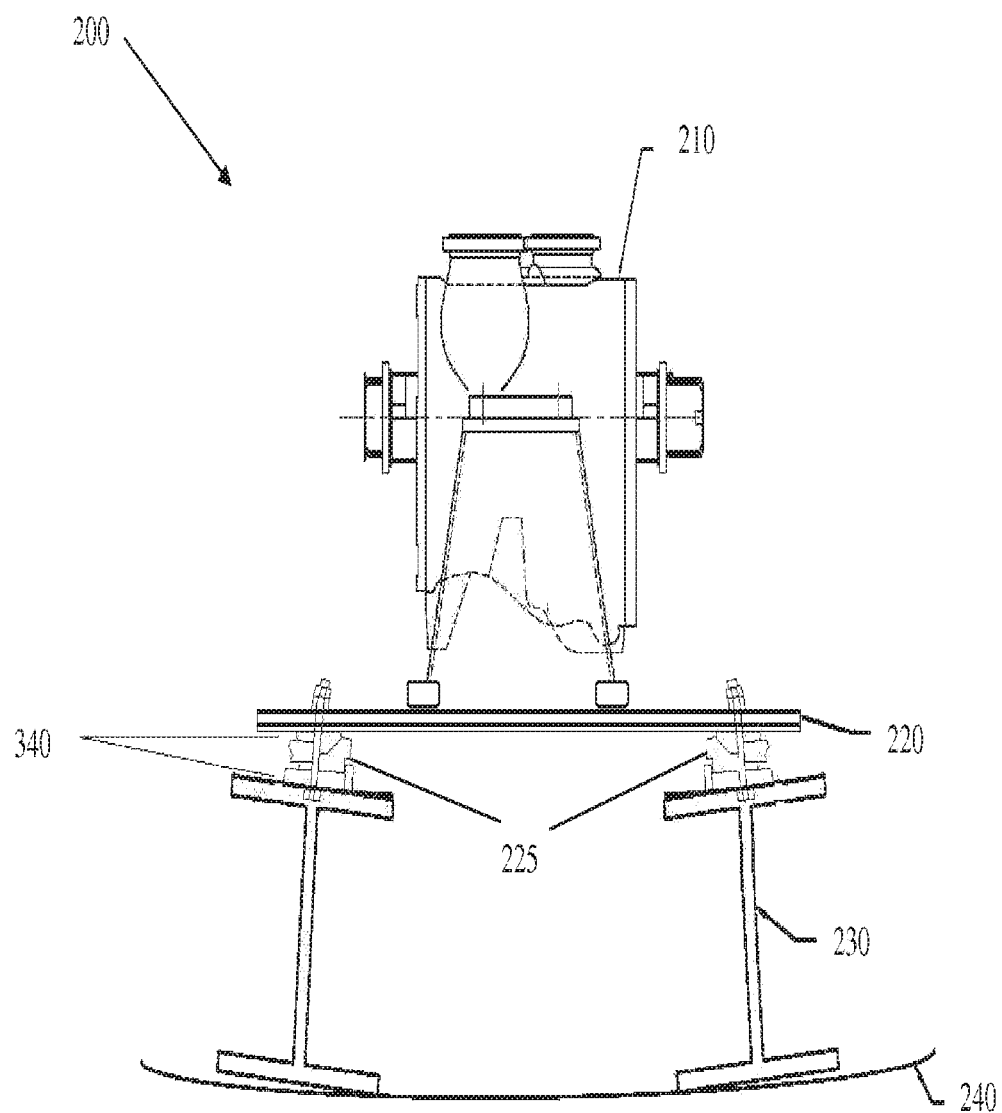
FIG. 4 is a side view of the module of FIG. 2a. The support structure is deflecting whereas the baseplate is substantially straight.

FIG. 4 shows module 200 being transported from a module yard to an EPC project site on a module surface 240. During transportation, support structure 230 and/or module surface 240 may experience sag and impact loads along its length and/or width, and thus deflect as a result of these loads. In conventional modules, these bending forces and moments are transferred to the baseplate, which can cause permanent deformation of the baseplate and machinery.

Chocks 225 prevent deflection of baseplate 220 due to their self-leveling capability. More specifically, when support structure 230 bends and deflects, washer 310 slides with respect to top annular member 320, thus allowing angle 360 to fluctuate. There is enough clearance between both (i) the outer diameter of the anchor bolt 340 and the through hole of washer 310, and (ii) the anchor bolt 340's nut and baseplate 220 such that baseplate 220 can maintain a horizontal configuration (e.g., a level orientation) while the support structure 230 may have deflected. In this manner, chocks 225 prevent the transfer of twisting and bending moments from support structure 230 to baseplate 220.

Module 200 thus provides a means for isolating (or reducing the transfer of) deflection forces between the baseplate and support structure. In this manner, warping of the baseplate is eliminated or at least partially reduced. While some kinds of chocks have been used conventionally to address the issues of soft foot (e.g., unequal distribution of weight and lack of full contact between the feet and the mounting pads/pedestals), those of ordinary skill in the art have failed to appreciate that adjustable, self-leveling chocks can be used to isolate deflection that occurs during transportation of a module for an EPC project.

Machinery 210 can be any piece of machinery, equipment, or structure that is needed for an EPC project, including but not limited to, pumps, drivers, compressors, motors, fans, blowers, and the like. Additional examples of equipment and installation requirements are disclosed in further detail in U.S. Provisional Application Ser. No. 61/831,052 and U.S. Provisional Application Ser. No. 62/007,363, which are incorporated herein by reference. In some instances, machinery 210 may produce oscillations (e.g., centrifugal compressors, rotary motors, etc.) that may further produce sag, fatigue, and deflection in the module components (e.g., baseplate, chocks, support structure, module surface, etc.).

Chocks 225 (including washer 310, top member 320, bottom member 330, and anchor bolt 340) can be made of any material and manufactured by any process that provides suitable strength for the application in which it is used. Factors such as weight, size, and type of machinery may affect the material, size/dimensions, and manufacturing process of chocks 225. In addition, the properties of the baseplate and support structure may also affect the material and manufacturing process of chocks 225. Moreover, the amount of deflection and the required range for angle 360 may also affect the material and configuration of chocks 225. Even still, the temperature conditions may also affect the configuration of chocks 225. In some embodiments, chocks 225 are suitable for winter use (in temperatures as low as negative 40 degrees Fahrenheit) and are designed for shock loading of 3.0 g's (gravitational acceleration) or better.

In some embodiments, chocks 225 are made of steel and are machined with high tolerances. In particular, the flat top surface 312 of washer 310 that contacts the underside of baseplate 220, and the bottom surface of the bottom annular member 330 that contacts the top surface of support structure 230, are machined to have a flatness of 0.002 inches or better and a surface finish of Ra 250 micro-inches or better.

Baseplate 220 and support structure 230 can be made of any material suitable for supporting the weight of machinery 210. In some embodiments, baseplate 220 is made of steel or a composite epoxy polymer. In some embodiments, support structure 230 is a steel I-beam. Moreover, the portions of the underside of baseplate 220 that come in contact with the chocks are made to have a flatness of 0.002 inches or better and a surface finish of Ra 250 micro-inches or better. Similarly, the portions of the top surface of support structure 230 that come in contact with the chocks are made to have a flatness of 0.002 inches or better and a surface finish of Ra 250 micro-inches or better. In addition, all surfaces contacting chocks 225 can be level within 0.0005 inch/foot in two directions 90 degrees opposed. In some embodiments, the surfaces contacting chocks 225 are free from paint and grease. In addition, the taper between baseplate 220 and support structure 230 can be less than 4 degrees (less than 0.069" over 1-inch distance).

Baseplate 220 can be a single piece or multiple pieces joined together. In some instances, baseplate 220 may be multiple pieces of steel welded together and are of the non-grout type. In some embodiments, support structure 230 has an ultimate sag under vertical load that does not exceed 0.1 mm/m of the structure's span or 0.04 inches (1 mm), whichever is lower. Moreover, for some applications, structure 230 may have a minimum torsional stiffness of $1\times10^5$ in-lb./rad ($113\times10^2$ N-m/rad).

In yet other aspects of some embodiments, the contact area between the chocks and baseplate and support structure can be 80% or better.

Several examples of implementations of the inventive subject matter are disclosed in U.S. Provisional Application Ser. No. 61/831,052 and U.S. Provisional Application Ser. No. 62/007,363 in greater detail. More specifically, the appendices of these applications include guidelines, criteria, and considerations for installation of rotating equipment and reciprocating equipment, including their auxiliary systems. The appendices provide details about the minimum preservation and protection measures during storage of equipment, dynamic analysis of steel structure, vibration limits, piping, baseplates, alignment, piping and supports, nozzle loads, and verifications to be performed in the module yard and at job sites. Tolerances and application limits are also prescribed. In addition, the appendices outline various components and requirements for analytical methods that are required not only for installation of machinery on transportable modules but also for reliable operation of the equipment. The details disclosed in the appendices are provided merely as exemplary embodiments and are not intended to limit the inventive subject matter unless those details are explicitly referenced in the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of transporting machinery in a modular fashion, comprising the steps of:

assembling a module that comprises the machinery, a baseplate, at least two support structures, and a plurality of self-leveling chocks by:
  securing the baseplate to a first support structure by placing a first self leveling chock and a second self-leveling chock between the baseplate and the first support structure;
  securing the baseplate to a second support structure by placing a third self-leveling chock and a fourth self-leveling chock between the baseplate and the second support structure;
  placing the machinery on top of the baseplate and optionally securing the machinery to the baseplate;
  transporting the module from a first location to a second location such that at least one of the first and second support structures experiences at least one of deflection, bend, or twist; and
  wherein the self-leveling chocks reduce or isolate the transfer of at least one of deflection forces, bending forces, and twisting forces from the at least one of the first and second support structure to the baseplate.

2. The method of claim 1, wherein the baseplate is substantially planar.

3. The method of claim 2, wherein, during the step of transporting the module from a first location to a second location, the baseplate remains substantially planar.

4. The method of claim 1, wherein each of the self-leveling chocks comprises:
  a top annular member threadably coupled with a bottom annular member, wherein rotating the top annular member relative to the bottom annular member adjusts the vertical height of the self-leveling chock;
  a washer having a substantially flat top surface and a convex bottom surface that slidably couples with a concave top surface of the top annular member; and
  a through-hole disposed through the center of the washer, top annular member, and bottom annular member and that is sized and dimensioned to receive a bolt.

5. The method of claim 4, wherein the step of securing the baseplate to a first support structure comprises:
  placing the bottom annular members of the first and second self-leveling chocks on the first support structure;
  placing the baseplate on the top annular members of the first and second self-leveling chocks;
  aligning the through-holes of the first and second self-leveling chocks with holes on the baseplate and first structural support;
  inserting a bolt through the through-holes of the baseplate, first and second self-leveling chocks, and first structural support; and
  fastening a nut on each end of each bolt.

6. The method of claim 5, further comprising the step of adjusting the height of the first and second self-leveling chocks before completely tightening the nuts.

7. The method of claim 5, wherein the step of securing the baseplate to a second support structure comprises:
  placing the bottom annular members of the third and fourth self-leveling chocks on the second support structure;
  placing the baseplate on the top annular members of the third and fourth self-leveling chocks;
  aligning the through-holes of the third and fourth self-leveling chocks with holes on the baseplate and second structural support;
  inserting a bolt through the through-holes of the baseplate, third and fourth self-leveling chocks, and second structural support; and
  fastening a nut on each end of each bolt.

8. The method of claim 7, further comprising the step of adjusting the height of the first, second, third, and fourth self-leveling chocks before tightening the nuts to a specified torque.

9. The method of claim 1, wherein the first support structure and second support structure are a steel I-beam.

10. The method of claim 1, wherein underside surfaces of the baseplate and the top surfaces of the at least two support structures that come in contact with the self-leveling chocks have a flatness of 0.002 inches or better and a surface finish of Ra 250 micro-inches or better.

* * * * *